United States Patent [19]

Williams et al.

[11] 4,366,294

[45] Dec. 28, 1982

[54] WATER SWELLABLE COMPOSITIONS

[75] Inventors: Earl P. Williams, Pen Argyl, Pa.; Donald H. Lorenz, Basking Ridge, N.J.

[73] Assignee: GAF Corporation, New York, N.Y.

[21] Appl. No.: 278,277

[22] Filed: Jun. 29, 1981

[51] Int. Cl.$^3$ .............................................. C08L 37/00
[52] U.S. Cl. ................... 525/327.6; 525/378; 525/379; 526/271
[58] Field of Search ............... 526/271; 525/328, 378, 525/379

[56] References Cited

U.S. PATENT DOCUMENTS

| | | | |
|---|---|---|---|
| 3,448,088 | 6/1969 | Azorlosa | 260/78.5 |
| 3,669,103 | 6/1972 | Harper et al. | 128/156 |
| 3,670,731 | 6/1972 | Harmon | 128/284 |
| 3,684,776 | 8/1972 | Field et al. | 260/78.5 T |
| 3,684,777 | 8/1972 | Field et al. | 260/78.5 T |
| 3,794,622 | 2/1974 | Breslow | 260/78.5 BB |
| 3,878,151 | 4/1975 | Dachs et al. | 260/29.6 T |
| 3,997,484 | 12/1976 | Weaver et al. | 260/17.4 GC |

Primary Examiner—Joseph L. Schofer
Assistant Examiner—Bernard Lipman
Attorney, Agent, or Firm—James Magee, Jr.; Joshua J. Ward; J. Gary Mohr

[57] ABSTRACT

Water swellable reaction product of monobasic amine and crosslinked interpolymer of maleic anhydride, monovinyl alkyl ether and 1–5 mole percent crosslinking agent comprising divinyl ether of aliphatic diol.

11 Claims, No Drawings

WATER SWELLABLE COMPOSITIONS

BACKGROUND OF THE INVENTION

Crosslinked polymers which are insoluble in water, but are capable of absorbing large amounts of water are known in the art and are used for instance in disposable diapers, sanitary napkins and tampons as well as being used as horticultural and agricultural aids. U.S. Pat. Nos. 3,997,484, 3,669,103 and 3,670,731 for instance describe such polymers and their uses.

U.S. Pat. No. 3,448,088 describes water soluble crosslinked interpolymers which are useful as viscosity improvers.

SUMMARY OF THE INVENTION

It is an object of the present invention to provide water swellable compositions useful for absorbing large amounts of aqueous fluids.

Water swellable compositions of the invention consist essentially of reaction products of monobasic amines and crosslinked interpolymers consisting essentially of substantially equimolar quantities of maleic anhydride and monovinyl alkyl ether wherein the alkyl group contains from 1 to 4 carbon atoms and from about 1 to about 5 mole percent based on the monovinyl alkyl ether of a crosslinking agent having the formula selected from the class consisting of:

$$H_2C=CH-O-X_1-OCH=CH_2$$

and $$H_2C=CH-(OX_2)_n-OCH=CH_2$$

where $X_1$ represents an alkylene group of two to twelve carbon atoms and $X_2$ represents an alkylene group of two to four carbon atoms and n represents an integer of 2 to 100.

DETAILED DESCRIPTION OF THE INVENTION

As mentioned above, the interpolymers described in U.S. Pat. No. 3,448,088 are water soluble and useful as viscosity improvers. The water swellable compositions of the present invention are reaction products of monobasic amines and crosslinked interpolymers which, except for the use of much larger amounts of crosslinking agent, are essentially the same as the interpolymers described in U.S. Pat. No. 3,448,088. The materials of the present invention are, however, water swellable without being water soluble. This enables compositions of the invention to absorb and retain unusually large quantities of aqueous fluids as swollen gel particles. Compositions of the invention have utility in various applications where super absorbency is desired, such as in diapers, sanitary napkins, tampons, adult incontinent products and as horticultural and agricultural aids. On contact with water the polymeric particles of compositions of the invention swell and absorb water rapidly until saturated. Saturation level or fluid absorbency varies with water characteristics such as hardness, ionic strength and pH; however, fluid absorption capacity is significant even with adverse conditions such as high ionic content water.

In preparing compositions of the invention, anhydride interpolymer is first prepared and then reacted with monobasic amine to form the desired reaction product. Excess amine is normally used to produce product having ½ amide content but product of less than ½ amide content can be produced by restricting the amount of amine used to an amount calculated to provide the desired amide content. Monobasic amine is used to prevent additional crosslinking which would result in deswelling or loss of hydrophilic properties by diamide formation. The lower monobasic amines produce more highly hydrophilic derivates while the higher amines produce derivatives having higher hydrophobic power. The choice of the particular amine therefore depends on the balance desired in the final derivative between hydrophobic properties and hydrophilic properties such as degree of swelling. In general primary or secondary amines, not necessarily aliphatic in nature, containing from 1 to 18 carbon atoms may be utilized, as well as ammonia. Illustrative amines include methyl, ethyl, propyl, n-butyl, octyl, decyl and lauryl amines, dimethyl amine, dibutyl amine, dioctyl amine, dilauryl amine, aniline, cyclohexyl amine and many others.

In the preparation of the parent anhydride interpolymer of this invention, any of the monovinyl alkyl ethers or mixtures of these containing from 1 to 18 carbon atoms in the alkyl moiety may be utilized, providing that the amount of admixed vinyl ether of greater than 3 alkyl carbon atoms is less than 10 mole percent of the total vinyl ether content. It is preferred, however, to utilize the lower alkyl vinyl ethers such as methyl vinyl ether, ethyl vinyl ether, or isopropyl vinyl ether. Of these, methyl vinyl ether is much preferred. Among other monovinyl ethers that may be mentioned are propyl vinyl ether, butyl vinyl ether, isobutyl vinyl ether, hexyl vinyl ether, octyl vinyl ether, decyl vinyl ether, dodecyl vinyl ether, hexadecyl vinyl ether and octadecyl vinyl ether.

The crosslinking agent is a divinyl ether of an aliphatic diol and selected from the class consisting of:

$$H_2C=CH-O-X_1-OCH=CH_2$$

and $$H_2C=CH-(OX_2)_n-OCH=CH_2$$

wherein X represents an alkylene group of from 2 to 12 carbon atoms, preferably from 2 to 6 carbon atoms and wherein $X_2$ represents an alkylene group of from 2 to 4 carbon atoms and wherein n represents an integer from 2 to 100, preferably from 2 to 4.

The polymerization is carried out conveniently by preparing a solvent solution of the monomers and adding a catalytic amount (preferably from 0.001 to 1.0%) of an organic free-radical-generating initiator. The resulting solution is mixed thoroughly and heated sufficiently so that the polymerization reaction takes place. At the completion of the polymerization reaction, the precipitated interpolymer is isolated by any suitable means such as by filtration or distillation of solvent, then washed with fresh solvent and vacuum dried. Moreover, the polymerization may also be conducted by adding a solution of the vinyl ether to a solution of initiator, maleic anhydride and solvent, or by adding a solution of divinyl ether to a solution of maleic anhydride, monovinyl ether, solvent and initiator.

The amount of solvent is not critical and such solvents as benzene, toluene, xylene, acetone, methyl ethyl ketone, methylene chloride and if so desired, even an excess of the alkyl vinyl ether employed may be added as solvent since the polymer formed consists of equimolar alternating units of vinyl ether and maleic anhydride. Benzene or methyl vinyl ether are considered the most suitable from the standpoint of product isolation and obtaining high molecular weights.

Among the organic free-radical-generating initiators that may be mentioned are azobisisobutyronitrile, benzoyl peroxide, lauroyl peroxide, caprylyl peroxide, acetyl peroxide, acetyl benzoyl peroxide, di-tert-butyl peroxide, azobis(2,4-dimethyl-valeronitrile) and the like. Mixtures of such catalysts are also suitable in the process of making the interpolymers of the invention. Radiation polymerization can be used too, e.g. such high energy radiation sources as ultraviolet light, x-rays, gamma-rays, neutrons and the like can be used to initiate polymerization.

The polymerization may be carried out at a temperature within the range of 0° to 150° C. Preferred temperatures are, for the most part, in the range from 50° to 100° C., particularly about 60°-80° C.

As mentioned the amount of crosslinking agent used may vary from about 1 to about 5 mole percent based on monovinyl alkyl ether. Examples of the divinyl ethers of an aliphatic diol that may be mentioned as crosslinking agents are the divinyl ethers of 1,2-ethanediol; 1,3-propanediol; 1,4-butanediol; 1,5-pentanediol; 1,6-hexanediol; 1,7-heptanediol; 1,8-octanediol; 1,9-nonanediol; 1,10-decanediol; 1,11-unidecanediol; and 1,12-dodecanediol, as well as the divinyl ethers of diethylene glycol, triethylene glycol, tetraethylene glycol, pentaethylene glycol; hexaethylene glycol, heptaethylene glycol, octaethylene glycol, nonaethylene glycol, decaethylene glycol and further polyalkylene glycols up to a molecular weight of about 5900.

The following Examples are intended to illustrate the invention without limiting the scope thereof.

EXAMPLE 1

An interpolymer was prepared from the following ingredients:
1854 grams (18.9 moles) maleic anhydride
1374 grams (23.6 moles) methyl vinyl ether
114 grams (0.8 moles) butanediol divinyl ether
3 grams lauroyl peroxide
21,400 grams benzene

Procedure

The maleic anhydride was dissolved in 5000 mls benzene and filtered to remove traces of maleic acid and the solution charged to a 10 gallon reactor. An additional 19,300 mls of benzene, 2 grams lauroyl peroxide dissolved in 50 ml benzene and 12 grams butanediol divinylether were also added to the reactor. Air in the reactor was removed by pulling vacuum and releasing with nitrogen three times, then the vacuum was released with a slight positive nitrogen pressure. 134 grams methyl vinyl ether was then charged from a cylinder and the reaction mixture heated to 70° C.

A mixture of 1240 grams methyl vinyl ether and 102 grams butanediol divinylether was then added over a period of 2 hours at 70° C., then held an additional 2 hours at 70° C.

1 gram lauroyl peroxide dissolved in 50 mls benzene was then added and held an additional 2 hours at 70° C.

The reaction mixture was then cooled to room temperature and filtered and dried. A test for unreacted maleic anhydride using triphenyl phosphine showed that all maleic anhydride had been converted. A 0.5% polymer concentration in water at pH 6.2 (NaOH) had a Brookfield viscosity of 29,600 cps.

Half amide ammonimum carboxylate of the resulting interpolymer was then prepared by introducing ammonia into 500 grams of the interpolymer through a fritted glass tube while stirring the interpolymer. The ammonia was introduced slowly so as not to allow the powdered interpolymer to become heated in excess of 35° C. The addition was continued until there was no longer any heat of reaction and the product was then filtered through a no. 20 U.S. sieve, purged with nitrogen and placed in a vacuum oven at −28 inches of mercury at 40° C. for 2 hours. A 1% solution of the resulting material in water had a pH of 6.3 and a Brookfield viscosity of 132,800 cps. with a number 7 spindle at 10 RPM. This material was successfully tested as an absorbent in wound dressings.

In a similar manner, partial amides of less than one-half amide content may be prepared by adding only the desired amount of ammonia.

EXAMPLE 2

An interpolymer was prepared from the following ingredients:
58.8 grams (0.6 mole) maleic anhydride
1.7 grams (0.012 mole) butanediol divinyl ether
0.6 grams (0.0018 mole) decanoyl peroxide
353 grams (6.08 grams) methyl vinyl ether

Procedure

To a 1-liter magnadrive autoclave was charged 58.8 grams maleic anhydride, 1.7 grams butanediol divinyl ether and 0.6 grams decanoyl peroxide. The autoclave was purged three times with nitrogen by evacuation and release. The autoclave was finally evacuated and 353 grams methyl vinyl ether added and stirred for 15 minutes at ambient temperature. The reaction mixture was then heated to 45° C. over ½ hour then raised to 50° C. over ½ hour and held for 4 hours at 50°-56° C. and 40-64 psig. The stirring was then stopped and the excess methy vinyl ether carefully vented for ½ hour. Vacuum was then applied until a negative pressure of −28″ Hg was reached at a temperature of 43° C.

74 grams of polymer powder was discharged. A test for unreacted maleic anhydride using triphenylphosphine paper showed that all maleic anhydride had been reacted.

0.5% polymer at pH 6.5 (NaOH) in 0.08% Na$_2$SO$_4$ had a Brookfield viscosity of 34,800 cps.

The interpolymer thus prepared may be reacted with ammonia as described above to produce a partial amide ammonium carboxylate. Alternatively, the interpolymers of examples 1 and 2 may be slurried in a non-solvent such as benzene, heptane or the like before being reacted with the ammonia. Such interpolymers may also be mixed with desired amounts of ammonium bicarbonate and the powder blend heated to 60° C. to form the partial amide ammonium carboxylates in situ.

EXAMPLE 3

A partial long chain amide of the interpolymer described in Example 1 was formed by reacting 10 grams of the interpolymer with 0.08 grams of octadecyl amine in 100 grams of heptane for 72 hours at 25° C. The heptane was then evaporated off and the polymer product was dried in a vacuum oven at −28 inches of mercury at 65° C. 9.7 grams of the dried polymer was then added slowly to 0.8 grams of anhydrous ammonia.

In a similar manner, 10 grams of the interpolymer was reacted with 0.32 grams octadecylamine followed by reaction with 0.8 grams anhydrous ammonia.

While the invention has been described above with respect to preferred embodiments thereof, it will be understood by those skilled in the art that various changes and modifications may be made without departing from the spirit and scope of the invention.

What we claim is:

1. A water swellable composition consisting essentially of reaction product of monobasic amine and cross-linked interpolymer consisting essentially of substantially equimolar quantities of maleic anhydride and a monovinyl alkyl ether wherein the alkyl group contains from 1 to 4 carbon atoms and from about 1 to about 5 mole percent, based on the monovinyl alkyl ether, of a crosslinking agent having a formula selected from the class consisting of:

$$H_2C=CH-O-X_1-OCH=CH_2$$

and $$H_2C=CH_2-(OX_2)_n-OCH=CH_2$$

where $X_1$ represents an alkylene group of two to twelve carbon atoms and $X_2$ represents an alkylene group of two to four carbon atoms and n represents an integer of 2 to 100.

2. Water swellable composition of claim 1 wherein the monovinyl alkyl ether is methyl vinyl ether.

3. Water swellable composition of claim 1 wherein the monovinyl ether is ethyl vinyl ether.

4. Water swellable composition of claim 1, wherein the crosslinking agent has the formula:

$$H_2C=CH-O-X_1-O-CH=CH_2$$

in which $X_1$ represents a butylene radical.

5. Water swellable composition of claim 1, wherein the crosslinking agent has the formula:

$$CH_2=CH(OX_2)_n-OCH=CH_2$$

in which $X_2$ is ethylene and n is 2.

6. Water swellable composition of claim 1 wherein the monobasic amine comprises ammonia.

7. Water swellable composition of claim 1 wherein the monobasic amine comprises octadecyl amine.

8. Water swellable composition of claim 1 wherein the monobasic amine consists essentially of ammonia.

9. Water swellable composition of claim 1 wherein the monobasic amine comprises octadecyl amine and ammonia.

10. Water swellable composition of claim 6 wherein the monovinyl alkyl ether is methyl vinyl ether, and the crosslinking agent has the formula:

$$H_2C=CH-O-X_1-O-CH=CH_2$$

in which $x_1$ represents a butylene radical.

11. Water swellable composition of claim 6 wherein the monovinyl alkyl ether is ethyl vinyl ether and the crosslinking agent has the formula:

$$CH_2=CH(OX_2)_N-OCH=CH_2$$

in which $X_2$ is ethylene and n is 2.

* * * * *